United States Patent
Jacobsson

(10) Patent No.: US 12,480,718 B2
(45) Date of Patent: Nov. 25, 2025

(54) THERMOCHEMICAL ENERGY STORAGE DEVICE

(71) Applicant: TEXEL Energy Storage AB, Gothenburg (SE)

(72) Inventor: Lars Valentin Jacobsson, Hovås (SE)

(73) Assignee: TEXEL Energy Storage AB, Gothenburg (SE)

( * ) Notice: Subject to any disclaimer, the term of this patent is extended or adjusted under 35 U.S.C. 154(b) by 21 days.

(21) Appl. No.: 18/005,576

(22) PCT Filed: Jul. 16, 2021

(86) PCT No.: PCT/SE2021/050733
§ 371 (c)(1),
(2) Date: Jan. 13, 2023

(87) PCT Pub. No.: WO2022/015232
PCT Pub. Date: Jan. 20, 2022

(65) Prior Publication Data
US 2023/0272981 A1 Aug. 31, 2023

(30) Foreign Application Priority Data
Jul. 16, 2020 (SE) .................................. 2050897-04

(51) Int. Cl.
*F28D 20/00* (2006.01)
(52) U.S. Cl.
CPC .................................. *F28D 20/003* (2013.01)
(58) Field of Classification Search
CPC ......... F03D 9/17; F28D 20/003; Y02E 10/50; Y02E 60/14; Y02E 70/30
See application file for complete search history.

(56) References Cited

U.S. PATENT DOCUMENTS 4,054,126 A * 10/1977 Ervin, Jr. ................ F24D 11/00
126/645
4,192,371 A 3/1980 Derouette et al.
(Continued)

FOREIGN PATENT DOCUMENTS

AU 2017210155 A1 * 8/2018 ............... G21B 1/00
CA 2814454 A1 * 9/2011 ............. F03G 6/068
(Continued)

OTHER PUBLICATIONS

Lototskyy et al., Development of a high-pressure 700 bar metal hydride hydrogen compressor, Journal of Energy Storage (Year: 2024).*

(Continued)

*Primary Examiner* — Ljiljana V. Ciric
(74) *Attorney, Agent, or Firm* — Knobbe, Martens, Olson & Bear, LLP

(57) ABSTRACT

A device for storing electric energy includes a heat reaction chamber. The heat reaction chamber can include a metal carbonate or a metal hydride material, a gas storage and an electric heater adapted to heat the reaction chamber, a Stirling engine including a heater head and adapted to be powered by the heated reaction chamber, a generator connected to and adapted to be driven by the Stirling engine. The device can be provided with a compressor arranged downstream of the reaction chamber and upstream of the gas storage adapted to increase the pressure of the gas flowing into the gas storage from the reaction chamber, and a pressure relief valve arranged downstream of the gas storage and upstream of the heat reaction chamber adapted to control the pressure of the gas flowing into the reaction chamber from the gas storage.

9 Claims, 2 Drawing Sheets

(56) References Cited

U.S. PATENT DOCUMENTS

| | | | | |
|---|---|---|---|---|
| 4,200,144 | A * | 4/1980 | Sirovich | F25B 17/12 165/104.12 |
| 4,402,915 | A * | 9/1983 | Nishizaki | C01B 3/0005 62/46.3 |
| 4,832,913 | A * | 5/1989 | Hong | C01B 3/0078 423/644 |
| 5,122,338 | A * | 6/1992 | Wallace | F25B 17/12 420/416 |
| 9,777,968 | B1 * | 10/2017 | Vajo | F28D 20/003 |
| 10,443,139 | B2 * | 10/2019 | Mills | H02S 40/425 |
| 10,443,954 | B1 * | 10/2019 | Zidan | F28D 20/003 |
| 10,641,524 | B2 * | 5/2020 | Lavine | F24S 23/74 |
| 10,753,275 | B2 * | 8/2020 | Mills | F02B 51/04 |
| 11,009,261 | B2 * | 5/2021 | Lovegrove | B65G 5/00 |
| 11,230,776 | B2 * | 1/2022 | Mills | H02S 40/42 |
| 11,333,069 | B2 * | 5/2022 | Mills | H01M 8/188 |
| 11,885,034 | B2 * | 1/2024 | Mills | H02S 40/22 |
| 11,976,235 | B2 * | 5/2024 | Ward | F28D 20/003 |
| 11,994,086 | B2 * | 5/2024 | Westberg | F23D 14/22 |
| 12,044,164 | B2 * | 7/2024 | Mills | H01M 8/186 |
| 2004/0065171 | A1 * | 4/2004 | Hearley | B22F 9/082 75/255 |
| 2011/0100356 | A1 * | 5/2011 | Bliesner | F03G 6/071 126/618 |
| 2014/0072836 | A1 * | 3/2014 | Mills | H01M 14/00 429/422 |
| 2014/0238634 | A1 * | 8/2014 | Ronnebro | F28D 20/003 165/10 |
| 2015/0128636 | A1 * | 5/2015 | McAlister | F03D 13/20 422/187 |
| 2017/0070180 | A1 * | 3/2017 | Mills | H02S 40/22 |
| 2018/0159459 | A1 * | 6/2018 | Mills | G21B 3/00 |
| 2018/0193815 | A1 | 7/2018 | Letts | |
| 2019/0372449 | A1 * | 12/2019 | Mills | H02K 44/06 |
| 2020/0366180 | A1 * | 11/2020 | Mills | H02K 44/085 |
| 2020/0403555 | A1 * | 12/2020 | Mills | H02S 10/30 |
| 2021/0313606 | A1 * | 10/2021 | Mills | H01M 8/184 |
| 2022/0021290 | A1 * | 1/2022 | Mills | H02K 44/10 |
| 2023/0143022 | A1 * | 5/2023 | Mills | C25B 9/09 423/239.1 |
| 2023/0272981 | A1 * | 8/2023 | Jacobsson | F28D 20/003 165/10 |
| 2025/0055363 | A1 * | 2/2025 | Mills | H05H 1/01 |

FOREIGN PATENT DOCUMENTS

| | | | | |
|---|---|---|---|---|
| DE | 3809680 | A1 * | 9/1989 | |
| DE | 102014002761 | A1 * | 8/2015 | F03D 9/10 |
| EP | 0220678 | A1 * | 5/1987 | |
| EP | 4015811 | A1 * | 6/2022 | F02G 1/055 |
| FR | 3004246 | A1 | 10/2014 | |
| GB | 1287690 | A | 9/1972 | |
| GB | 1503850 | A | 3/1978 | |
| WO | WO-9010935 | A1 * | 9/1990 | |
| WO | WO-2011105989 | A2 * | 9/2011 | F03G 6/068 |
| WO | WO-2024110662 | A1 * | 5/2024 | C01B 3/0026 |
| WO | WO-2024110663 | A1 * | 5/2024 | C01B 32/50 |

OTHER PUBLICATIONS

International Preliminary Report on Patentability issued for International Patent Application No. PCT/SE2021/050733, dated Jan. 17, 2023 in 9 pages.

International Search Report and Written Opinion issued for International Patent Application No. PCT/SE2021/050733, dated Sep. 16, 2021 in 15 pages.

Swedish Office Action and Search Report issued for Swedish Patent Application No. 2050897-4, dated Mar. 5, 2021 in 8 pages.

* cited by examiner

THERMOCHEMICAL ENERGY STORAGE DEVICE

CROSS-REFERENCE TO RELATED APPLICATIONS

This application is the U.S. National Phase under 35. U.S.C. § 371 of International Application PCT/SE2021/050733, filed Jul. 16, 2021, which claims priority to Swedish Patent Application No. 2050897-4, filed Jul. 16, 2020. The disclosures of the above-described applications are hereby incorporated by reference in their entirety.

TECHNICAL HELD

The present invention relates to a device and system for storing renewable electric energy. The thermochemical device comprises a metal carbonate or a metal hydride and the energy is stored as a gas in a gas storage and is converted to electric energy by the use of a Stirling engine driving a generator.

BACKGROUND ART

Renewable energy is becoming more and more popular, and more and more systems for generating electricity from wind or the sun are developed and installed. Wind power plants generate electric energy through a rotating generator. Some solar power systems use photovoltaic cells to produce electricity directly, which may be converted to e.g. an appropriate alternating current for a grid system. Other solar power systems use mirrors to concentrate the radiation to a focus point in which a heat driven generator is positioned. The heat driven generator may be a Stirling engine, or in larger power plants, a steam turbine.

A disadvantage with renewable electric energy is that the produced electric energy is instant and that it is very expensive to store the electric energy in rechargeable battery cells. The cost for such a system is thus very high, and the system is often combined with a fuel based generator in order to produce electricity when the wind is not blowing or the sun is not shining.

It is also known to store energy as heat in different heat storing devices that may use e.g. melted material or phase-change material. The energy may be stored at low temperature or high temperature. Low temperature storage may e.g. include large water tanks that store hot water for heating purposes from summer to winter in isolated containers, High temperature storage may e.g. comprise salt compounds, sulphur, aluminium or graphite. With a high temperature storage, the heat may be used e.g. power a Stirling engine such that both heat and electricity can be obtained.

These system may work in some cases, but there is still room for improvements.

SUMMARY OF THE INVENTION

An object of the invention is therefore to provide a device for storing renewable electric energy. A further object of the invention is to provide a system for storing renewable electric energy. A further object of the invention is to provide a method for storing renewable electric energy.

The solution to the problem according to the invention is described in the present disclosure . Some embodiments of the present disclosure contain an advantageous system. Some embodiments of the present disclosure contain an advantageous method. Some aspects of the present disclosure contain ad vantageous embodiments and further developments of the device, the system and the method.

In a device for storing electric energy, comprising a heat reaction chamber comprising a metal carbonate or a metal hydride material, a gas storage and an electric heater adapted to heat the reaction chamber such that a gas is released, a Stirling engine comprising a heater head and adapted to be powered by the heat reaction chamber, a generator connected to and adapted to be driven by the Stirling engine, the object of the invention is achieved in that the device is provided with a compressor arranged downstream of the reaction chamber and upstream of the gas storage adapted to increase the pressure of gas flowing into the gas storage from the reaction chamber, and a pressure relief valve arranged downstream of the gas storage and upstream of the heat reaction chamber adapted to control the pressure of the gas flowing into the reaction chamber from the gas storage.

By this first embodiment of the energy storing device according to the invention, a thermochemical device that is adapted to store renewable electric energy is provided. The renewable electric energy is converted to heat with an electric heater, and the energy is stored as a gas in a gas storage. When electricity is required, the stored gas of the thermochemical storage device is released and creates heat that drives a Stirling engine connected to a generator, such that electricity is produced. In this way, electric energy produced by e.g. photovoltaic cells or wind can be stored in a relatively efficient and cost-effective manner.

The thermochemical storage device comprises a metal carbonate or a metal hydride. The advantage of using a thermochemical storage device comprising a metal carbonate or a metal hydride is that the energy is stored in a cold state, such that there is minimal energy loss during the storing of energy. The thermochemical storage device comprises a hot side and a cold side. The hot side is a reaction chamber in which heat is converted to storable energy or where the storable energy is converted to heat, and the cold side is a gas storage in which the energy is stored.

At the hot side, the temperature of the thermochemical storage device is relatively high, at least 750° C. and up to 900° C. or more. With such a high temperature, the efficiency of the thermochemical storage device is increased. A further advantage of using a high temperature at the hot side of the thermochemical storage device is that the efficiency of the Stirling engine is also improved. This will thus increase the efficiency of a complete energy storing system.

When the hot side of the thermochemical battery is heated with a heat source, a chemical reaction occurs which produces a gas, either a carbon dioxide ($CO_2$) gas or a hydrogen ($H_2$) gas. The gas is transferred from the hot side to the cold side, where the gas is stored. The energy in the form of a gas may be stored with minimal energy loss for long time periods, up to several years and more.

When the gas stored in the cold side of the thermochemical storage device is transferred back to the hot side, the energy of the gas will be released in the reaction chamber, and the hot side will be heated to a high temperature between 750 to 900° C. The heat is transferred to the Stirling engine that drives a generator that produces electricity.

It is important that the temperature at the hot side of the thermochemical storage device is held at a sufficiently high level during the energy recovery. The hot side of the thermochemical storage device may be insulated in order to minimize the energy loss. The heater head of the Stirling engine is integrated with the reaction chamber of the thermochemical storage device.

The electric heater may be a resistive electric heater that is integrated in the reaction chamber of the thermochemical storage device. The electric heater may also comprise an inductive transfer means.

BRIEF DESCRIPTION OF DRAWINGS

The invention will be described in greater detail in the following, with reference to the embodiments that are shown in the attached drawings, in which.

DETAILED DESCRIPTION OF THE PREFERRED EMBODIMENTS

The embodiments of the invention with further developments described in the following are to be regarded only as examples and are in no way to limit the scope of the protection provided by the patent claims.

Figure 1:
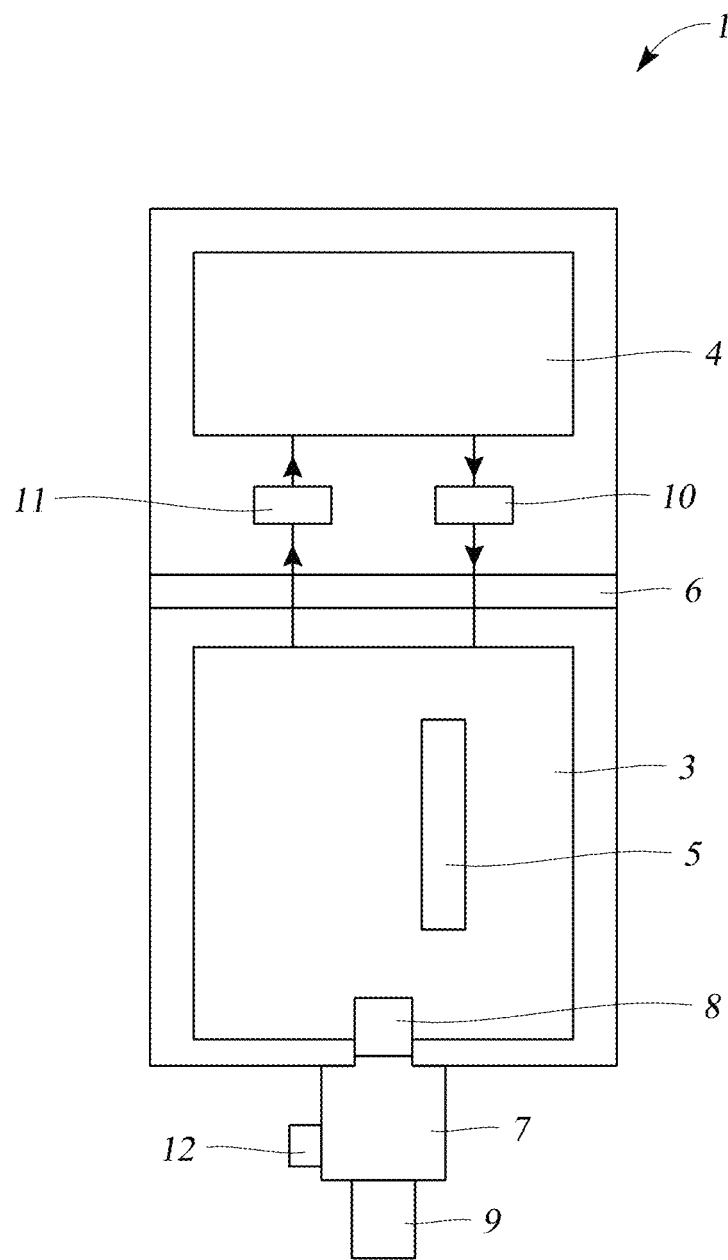
FIG. 1 shows an example of a device for storing electric energy according to the invention.

FIG. 1 shows an example of a device 1 for storing electric energy according to the invention. The device 1 is adapted to convert heat to storable energy and to convert the storable energy back to heat. The device is provided with a reaction chamber 3 that can be heated with any heat source, but in the described example, the reaction chamber is heated with electricity through an electric heater element 5 integrated in the reaction chamber. The reaction chamber comprises a thermochemical material, e.g. a metal carbonate or a metal hydride, which mill release a gas when it is heated. The shown device is adapted to work with temperatures between 750 to 900° C., and preferably 850 to 900° C. The reaction chamber is further adapted to release heat when the gas is reintroduced to the reaction chamber. The device further comprises a gas storage 4 adapted to store the gas. The gas is contained in a closed gas system. The closed gas system comprises the thermochemical material, a pressure valve 10, a compressor 11 and the gas storage 4.

The compressor 11 is arranged downstream of the reaction chamber 3 and upstream of the gas storage 4 and will move the gas from the reaction chamber to the gas storage when the reaction chamber is heated. The gas will release from the metal carbonate material with a relatively low pressure when the reaction chamber is heated. The pressure in the reaction chamber may be between one to a few bars when the reaction chamber is heated to around 900° C., depending on the used material. In order to obtain an economical system and to reduce the volume of the storage tank, the gas should be stored under a higher pressure in the gas storage. A pressure of between 20 to 80 bars or more is suitable, depending on the temperature and the gas. In one example when a metal carbonate is used, the temperature of the gas storage is 20° C. and the pressure is 65 bars. At this condition, the carbon dioxide liquefies and is stored as a liquid, which reduces the volume of the storage tank further.

The pressure relief valve 10 is arranged downstream of the gas storage 4 and upstream of the heat reaction chamber, and will control the release pressure of the gas flowing into the reaction chamber from the gas storage. The valve is completely closed when gas is stored in the gas storage. In order to provide an efficient regeneration of heat when reintroducing the gas into the reaction chamber, a gas pressure of around 10 bars may be required, depending on the used gas. The pressure relief valve will control the return pressure of the gas. An electronic control unit is used to control the compressor and the pressure relief valve. The device may also comprise various sensors for the monitoring and control of the device.

In order to increase the efficiency of the device further, a thermocline filter 6 may be arranged between the reaction chamber and the gas storage. The thermocline filter is preferably arranged between the reaction chamber and the compressor and the pressure relief valve. The released gas will pass through the thermocline filter before it is compressed, and will be cooled by the thermocline filter. The thermocline filter may e.g. comprise sand, which will absorb most of the heat from the gas passing through the filter. When the gas is reintroduced back to the reaction chamber, the gas can also flow through the thermocline filter, which will now preheat the gas before it enters the reaction chamber, which will further increase the efficiency of the device. It is also possible to use an additional cooler for the gas flowing into the gas storage in order to cool the gas to a low temperature. The gas storage 4 and the reaction chamber 3 are preferably insulated.

The device further comprises a Stirling engine 7 having a heater head 8. The heater head is adapted to collect heat to the hot side of the Stirling engine, such that the Stirling engine can rotate. In the shown example, the heated head is integrated with the reaction chamber. This will minimize the heat losses and will allow the Stirling engine to work with a high temperature between 750 to 900° C. This will also provide a compact solution. The Stirling engine is connected to a generator 9 that will produce electricity when driven by the Stirling engine.

The device further comprises a heat exchanger 12 that collects the heat from the cold side of the Stirling engine and that cools the cold side of the Stirling engine. This will increase the efficiency of the Stirling engine and the device. A total efficiency of the device is approximately 90%, where the device will output approximately 40% electric energy and 50% heat energy from the energy put into the device. The heat exchanger will supply heat that can be used e.g. for heating purposes of buildings etc. The heat exchanger may also be connected to the gas storage, where it may be used to cool the gas storage when the Stirling engine is not producing electricity and the coolant medium of the heat exchanger is at a low temperature. The heat exchanger may also be used to preheat the gas when it is released from the gas storage to the reaction chamber. By preheating the gas, the efficiency of the device is increased.

The energy will be stored at a low temperature in the device in the form of a gas. The device comprises a hot side and a cold side. The heat reaction chamber 3 is the hot side where heat is converted to storable energy or where the storable energy is converted to heat. The gas storage is the cold side where the energy in the form of a gas is stored. The electric energy that is to be stored will heat the heat reaction chamber, and the energy will be stored at the cold side. The term cold side is used in relation to the hot side, and means that the cold side is at a much lower temperature than the hot side. Depending on the pressure in the gas storage, the temperature in the cold side may be between 20 to 40° C.

The heat reaction chamber comprises a thermochemical material in the form of a metal carbonate or a metal hydride. A metal carbonate comprises carbon dioxide bonded to the metal, and a metal hydride comprises hydrogen bonded to the metal. The thermochemical material may comprise a metal or metal alloy comprising one or more different metals. The metal alloy is porous and is preferably in the form of a powder, either in powder form contained in a container or pressed to powder bricks.

When a reaction chamber comprising a metal carbonate is heated with a heat source, a chemical reaction occurs in which carbon dioxide ($CO_2$) gas is released from the metal carbonate. The gas is transferred from the hot side to the cold side, where the gas is stored, either as a gas or as a liquid. The gas may be stored with minimal energy loss for long time periods, up to several years and more. Examples of suitable metals that may be used in the reaction chamber are e.g. sodium, magnesium, titanium, calcium, aluminium, iron, strontium or barium. In the described example, a calcium carbonate, $CaCO_3$ is used. The calcium carbonate will release carbon dioxide $CO_2$ when heated, and calcium oxide CaO will remain in the reaction chamber.

In an ideal device that is empty or fully discharged, the reaction chamber will comprise e.g. a metal carbonate saturated with carbon dioxide. When the device is fully loaded, the reaction chamber will comprise a metal oxide with no bonded carbon dioxide, and the gas storage will contain the carbon dioxide. In an actual device, this will of course not be the case, but a load degree of 70-90% when compared to a theoretical value is possible to obtain, depending e.g. on the selected metal carbonate and the used temperatures.

The Stirling engine 7 is adapted to drive a generator 9 for producing electrical energy. The produced electrical energy is transferred to e.g. a power grid. The Stirling engine is powered by heat that is recovered from the device. In one example, the Stirling engine is adapted to run at a temperature between 750 to 900° C., which will provide a high efficiency and high power output. The heat is transferred directly from the reaction chamber to the heater head 8 of the Stirling engine, i.e. the heater head of the Stirling engine is integrated with the reaction chamber. By integrating the heater head directly with the reaction chamber, the efficiency of the device is increased.

The Stirling engine can be used to generate electricity when e.g. a renewable electric energy source is not delivering any or not enough electric energy, e.g. when the wind is not blowing or when the sun is not shining. Energy from the device is then released from the reaction chamber and is forwarded to the Stirling engine such that the Stirling engine will start to rotate and that the Stirling engine will drive the generator 9 to produce electricity. The Stirling engine may be of any size, but a nominal power output of between 1 kW to 100 kW or more is suitable, depending on the requirements of the used system. For higher power outputs, several devices may be arranged in parallel.

It is possible to let the generator produce an alternating current having a frequency directly corresponding to the frequency of a grid, or the generator is connected to a power converter that outputs a suitable frequency. The output of the power converter is adapted to the requirements, and may be either an alternating current or a direct current.

The advantage of using an electric heater to heat the reaction chamber is that it is a simple and cost-effective solution to store the energy produced by a renewable electric energy source. Normally, electricity produced by renewable electric energy sources are considered to be of a high quality that has to be stored as electricity in rechargeable batteries in order to preserve the high quality energy. To reduce the high quality electricity to low quality heat is considered as a downgrade that is not commercially sound. Instead, concentrated solar power has been used to focus the solar radiation either directly to a Stirling engine to produce electricity or to heat a heat storage.

However, since especially solar photovoltaic cells and wind power plants are becoming both cheaper and more efficient, and by using an efficient thermochemical storage device and an efficient Stirling engine, a cost-efficient solution is provided by heating a thermochemical storage device with electricity produced by a renewable electric energy source. By storing the energy in the thermochemical storage device as a gas, the efficiency of an energy system may be further increased.

It is of course also possible to heat the reaction chamber 3 with electricity produced by other means, such as fuel driven power plants. This may be a good solution in order to preserve electric energy that would otherwise be wasted. The inventive electric energy storage device may e.g. be used as a buffer to cover periods of low power consumption, where a conventional power plant is running with a constant and steady power output.

The storage device may also comprise a second means to provide heat to the Stirling engine. In case that the thermochemical storage device 1 is empty and cannot supply any heat to the Stirling engine, another means to heat the Stirling engine may be used. This means may comprise another fuel, e.g. a combustible gas of some kind or a combustible liquid of some kind. The combustible gas or liquid is stored in a separate container, and is used to heat the Stirling engine when the thermochemical storage device cannot heat the Stirling engine, e.g. during night or during prolonged times without sun. The combustible gas or liquid is ignited at the Stirling engine and will provide heat such that the Stirling engine will be able to drive the generator and thus to generate electricity even if the thermochemical storage device is empty.

Figure 2:
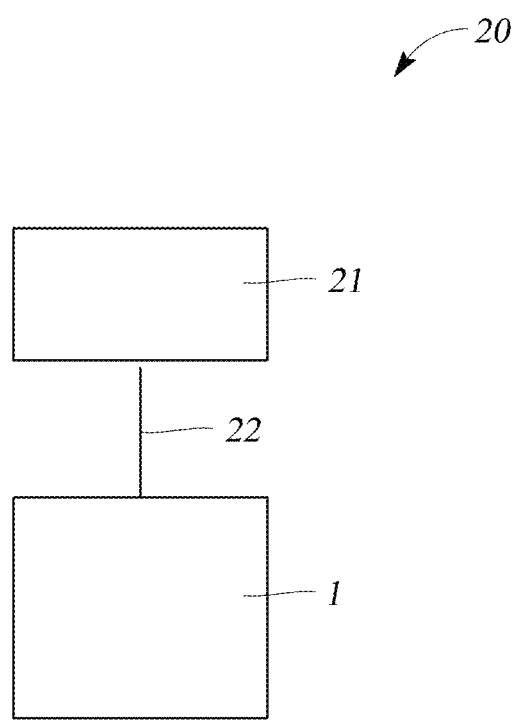
FIG. 2 shows an example of a system for storing renewable electric energy according to the invention.

In a system 20 for storing renewable electric energy, shown in FIG. 2, a renewable electric energy source 21 and an electric energy storage device 1 are comprised. The renewable electric energy source may be either a photovoltaic power plant that produces electric energy when the sun is shining or a wind power plant that produces electric energy when the wind is blowing. The electric energy is transferred from the renewable electric energy source to the electric heater of the device through an inlet power cable 22.

The invention is not to be regarded as being limited to the embodiments described above, a number of additional variants and modifications being possible within the scope of the subsequent patent claims. The thermochemical storage device may e.g. have any size and shape.

REFERENCE SIGNS

1: Thermochemical energy storage device
3: Reaction chamber
4: Gas storage
5: Electric heater
6: Thermocline filter
7: Stirling engine
8: Heater head
9: Generator
10: Valve
11: Compressor
12: Heat exchanger
20: System
21: Renewable power plant
22: Inlet cable

What is claimed is:

1. A device for storing electrical energy, comprising a reaction chamber comprising a metal carbonate or a metal hydride material, a gas storage and an electric heater adapted to heat the reaction chamber such that a gas is released, a Stirling engine comprising a heater head and adapted to be powered by the heated reaction chamber, a generator connected to and adapted to be driven by the Stirling engine, wherein the device is provided with a compressor arranged downstream of the reaction chamber and upstream of the gas storage and adapted to increase the pressure of the gas flowing into the gas storage from the reaction chamber, and a pressure relief valve with arranged downstream of the gas storage and upstream of the reaction chamber and adapted to control the pressure of the gas flowing into the reaction chamber from the gas storage.

2. The device according to claim 1, wherein the reaction chamber is adapted to hold the temperature between 750 degrees Celsius and 900 degrees Celsius when the reaction chamber is heated by electricity.

3. The device according to claim 2, wherein the reaction chamber is adapted to hold the temperature between 780 degrees Celsius and 900 degrees Celsius when the reaction chamber is heated by electricity.

4. The device according to claim 1, wherein the reaction chamber is adapted to hold the temperature between 750 degrees Celsius and 900 degrees Celsius when gas is regenerated in the reaction chamber.

5. The device according to claim 4, wherein the reaction chamber is adapted to hold the temperature between 850 degrees Celsius and 900 degrees Celsius when gas is regenerated in the reaction chamber.

6. The device according to claim 1, wherein the heat reaction chamber is arranged directly with at the heater head of the Stirling engine.

7. The device according to claim 1, wherein the electric heater is a resistive heater.

8. The device according to claim 1, wherein the electric heater is integrated inside the reaction chamber.

9. The device according to claim 1, wherein the device comprises a thermocline filter arranged between the reaction chamber and the gas storage.

\* \* \* \* \*